United States Patent
Seo et al.

(10) Patent No.: US 6,289,011 B1
(45) Date of Patent: Sep. 11, 2001

(54) 2N×N MULTIPLEXING SWITCH

(75) Inventors: Young Ik Seo; Chong Nam Lee, both of Seoul (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/081,650

(22) Filed: May 20, 1998

(30) Foreign Application Priority Data

May 21, 1997 (KR) .................................................. 97/19656

(51) Int. Cl.[7] .................................................. H04L 12/50
(52) U.S. Cl. ............................ 370/388; 370/412; 370/422
(58) Field of Search .................................... 370/386, 388, 370/395, 396, 389, 412, 413, 411, 422, 387, 357, 359, 363, 360, 392

(56) References Cited

U.S. PATENT DOCUMENTS

| | | | |
|---|---|---|---|
| 5,216,668 | * 6/1993 | Zhang | .................................. 370/411 |
| 5,383,181 | 1/1995 | Aramaki . | |
| 5,406,554 | 4/1995 | Parry . | |
| 5,412,646 | * 5/1995 | Cyr | ....................................... 370/412 |
| 5,448,559 | 9/1995 | Hayter et al. . | |
| 5,535,197 | 7/1996 | Cotton . | |
| 5,537,403 | * 7/1996 | Cloonan | .............................. 370/352 |
| 5,544,160 | * 8/1996 | Cloonan | .............................. 370/413 |
| 5,548,588 | 8/1996 | Ganmukhi et al. . | |
| 5,550,823 | 8/1996 | Irie et al. . | |
| 5,577,035 | 11/1996 | Hayter et al. . | |
| 5,608,719 | 3/1997 | Hyodo et al. . | |
| 5,610,914 | 3/1997 | Yamada . | |
| 5,619,510 | 4/1997 | Kurano . | |
| 5,642,349 | 6/1997 | Cloona et al. . | |
| 5,684,798 | 11/1997 | Gauthier . | |
| 5,687,172 | 11/1997 | Cloona et al. . | |
| 5,710,770 | 1/1998 | Kozaki et al. . | |
| 5,724,352 | 3/1998 | Cloona et al. . | |
| 5,724,354 | 3/1998 | Tremel et al. . | |
| 5,732,069 | 3/1998 | Nagino et al. . | |
| 5,732,085 | 3/1998 | Kim et al. . | |
| 5,745,789 | 4/1998 | Diaz et al. . | |
| 5,946,314 | * 8/1999 | Licciardi | .............................. 370/389 |
| 6,122,274 | * 9/2000 | Kumar | ................................. 370/395 |
| 6,157,643 | * 12/2000 | Ma | ....................................... 370/389 |

* cited by examiner

*Primary Examiner*—Douglas Olms
*Assistant Examiner*—Ricardo M. Pizarro
(74) *Attorney, Agent, or Firm*—Robert E. Bushnell, Esq.

(57) ABSTRACT

A 2n×n multiplexing switch has 2n VD(valid) extractors for validating the routing tags of the inputted cells and determine if the cell is to be saved or not, and generate VD signals, a FIFO buffer selector for selecting the FIFO buffer to store each cell using the VD signal and for transferring the cell to the selected FIFO buffer, a shared FIFO buffer consisting of 2n shared FIFO buffers and storing cells, an output device for reading cells stored in the FIFO buffers and for transferring n cells to output ports and a cell counter for counting cells currently stored in the shared FIFO buffer using the data from the FIFO buffer selector and the output device.

20 Claims, 9 Drawing Sheets

2NxN MULTIPLEXING SWITCH

CLAIM OF PRIORITY

This application makes reference to, incorporates the same herein, and claims all benefits accruing under 35 U.S.C. §119 from an application for 2nxn MULTIPLEXING SWITCH earlier filed in the Korean Industrial Property Office on May 21, 1997 and there duly assigned Ser. No. 19656/1997.

BACKGROUND OF THE INVENTION

1. Field of the Invention

The present invention relates to a 2nxn multiplexing switch used for implementing the Advanced ATM Exchange and particularly relates to a 2nxn multiplexing switch including a VD (Valid) extracting part for generating a VD signal for determining whether or not a cell is to be transmitted, a shared FIFO (First In First Out) buffer selecting device for selecting the shared FIFO buffer, an output device and a cell counter.

2. Description of the Related Art

Up to now the Advanced (large capacity) Switch is implemented using full identical –nxn switches.

The earlier nxn switch used for implementing large capacity switches, includes a port filtering device including n port filters for each port, a FIFO (First In First Out) buffer selecting device, a shared FIFO buffering device including n FIFOs and an output device. Namely, in the past for implementing an nxn switch 2n port filters, n FIFO buffer selecting devices, 2n FIFOs and n output devices were indispensable.

The switch, first of all, copies the input cells n times and respectively transmits them to the port filter for each port. The port filter recognizes whether the cell being inputted is to be transmitted to its port. If the cell being inputted is to be transmitted to its port, the port filter transmits the cell to the FIFO buffer selecting device. If not, the port filter discards the cell.

The FIFO buffer selecting device configures the FIFO address and the transmission line so that the cell which has passed through the port filter can be stored in the shared FIFO buffering device, and the output device reads a cell from the shared FIFO buffering device every cell time and transmits it to the output port.

For implementing the nxn switch as stated above, it has problems in that quite a few steps are required, and the shared FIFO buffering device, which is included correspondingly to each port, cannot be shared, so that the FIFO buffer to need be very large.

Particularly, when a large-capacity switch is to be implemented, it has also problems in that the complete sharing of the output port cannot be easily implemented and for implementing the large-capacity switch, a very large quantity of logic gates are needed.

In addition, there is a problem in that if once the large-capacity switch is implemented using the nxn switch, it has basically the architecture of a Banyan network and in the above case, a degradation to a considerable extent is unavoidable.

The following patents each disclose features in common with the present invention but do not teach or suggest the specifically recited multiplexing switch of the present invention: U.S. Pat. No. 5,745,489 to Diaz et al., entitled Buffered Crosspoint Matrix For An Asynchronous Transfer Mode Switch And Method Of Operation, U.S. Pat. No. 5,724,354 to Tremel et al., entitled Method For The Insertion Of Cells Into An ATM Type Flow And Implementation Device, U.S. Pat. No. 5,684,798 to Gauthier, entitled Communication System Comprising A Network And A Multiplexing Device And Multiplexing Device Suitable For Such A System, U.S. Pat. No. 5,687,172 to Cloonan et al., entitled Terabit Per Second Distribution Network, U.S. Pat. No. 5,724,352 to Cloonan et al., entitled Terabit Per Second Packet Switch Having Assignable Multiple Packet Loss Probabilities, U.S. Pat. No. 5,608,719 to Hyodo et al., entitled ATM Multiplex Transmission System Having Test Equipment, U.S. Pat. No. 5,610,914 to Yamada, entitled Shared Buffer Memory Switch For An ATM Switching System And Its Broadcasting Control Method, U.S. Pat. No. 5,619,510 to Kurano, entitled Output Buffer Type Asynchronous Transfer Mode Switch And Detecting Error Boards Thereof, U.S. Pat. No. 5,642,349 to Cloonan et al., entitled Terabit Per Second ATM Packet Switch Having Distributed Out-Of-Band Control, U.S. Pat. No. 5,577,035 to Hayter et al., entitled Apparatus And Method Of Processing Bandwidth Requirements In An ATM Switch, U.S. Pat. No. 5,383,181 to Aramaki, entitled Packet Switching System Capable Qf Reducing A Delay Time For Each Packet, U.S. Pat. No. 5,406,554 to Parry, entitled Synchronous FIFO Having An Alterable Buffer Store, U.S. Pat. No. 5,448,559 to Hayter et al, entitled ATM Communication System With Interrogation Of Output Port Servers For Available Handing Capacity, U.S. Pat. No. 5,550,823 to Irie et al., entitled Method And Apparatus For Performing Priority Control For Cells In Output Buffer Type ATM Switch, U.S. Pat. No. 5,535,197 to Cotton, entitled Shared Buffer Switching Module, U.S. Pat. No. 5,732,085 to Kim et al., entitled Fixed Length Packet Switching Apparatus Using Multiplexers And Demultiplexers, U.S. Pat. No. 5,732,069 to Nagino et al., entitled ATM Switch, U.S. Pat. No. 5,710,770 to Kozaki et al., entitled ATM Cell Switching System, and U.S. Pat. No. 5,548,588 to Ganmukhi et al., entitled Method And Apparatus For Switching, Multicasting Multiplexing And Demultiplexing An ATM Cell.

SUMMARY OF THE INVENTION

To solve the above described problems, it is the object of the present invention to provide a 2nx2 multiplexing switch, which makes it possible to use n output ports uniformly, and uses a smaller number of path assignment tags as compared to earlier arrangements, and can minimize the diminishment of the efficiency by using a common buffer type switch.

Other objects and benefits of the present invention become apparent, if the following detailed description of the present invention is read and the attached drawings are referenced. A preferable embodiment of a 2nxn multiplexing switch may be constructed according to the principles of the present invention with a VD (valid) extracting device having 2n VD extractors, which validate the routing tags of the inputted cells and determine if the cell is to be saved or not and generates a VD signal; a FIFO buffer selecting device, which selects FIFO buffer to store each cell using said VD signal and transfers each cell to the selected FIFO buffer; a shared FIFO buffering device having 2n shared FIFO buffers and storing cells; an output device, which reads cells stored in the FIFO buffers and transfers n cells to output ports; and a cell counter, which counts cells stored currently in the shared FIFO buffering device using the data from the FIFO buffer selecting device and the output device. In the practice of the present invention, it is preferable that the FIFO buffer selecting device comprises a FIFO buffer address extracting device and a Banyan routing network.

It is preferable that the FIFO buffer address extracing device generates a FIFO address buffer (FAB) using 2n adders and 2n buffers. It is preferable that the adders inputs an FAB read finally at the previous cell time and VD, and if the VD is zero, then one is added, or else zero is added, and the result becomes the input of the next adders and at the same time it is stored in the buffer.

It is preferable that the output device be constructed with a read FIFO buffer address (RFA) generator reading cell count(CCNT); a FIFO buffer read enable (FRE) generator, which inputs the read FIFO buffer address from the read FIFO buffer address generator; and an output cell multiplexing device, which inputs the read FIFO buffer address from the read FIFO buffer address generator and inputs cells from the shared FIFO buffering device.

It is preferable that the read FIFO buffer address generator be constructed with n adders, which add one if the cell count read finally before one cell time is above zero, or else adds zero, and inputs the result to the next adder; and n buffers, which at the same time inputs the values inputted from the adders.

It is preferable that the $i^{th}$ adder adds one, if the cell count inputted from previous adder is above i, or else adds zero, and transfers the result to the next adder and to the buffers.

It is preferable that the FIFO buffer read enable generator generates a FIFO buffer address enable signal using an RFA generated by the RFA generator, and includes 4n+1 comparators, 4n OR gates and 6n AND gates.

It is preferable that the output cell multiplexing device has n number of 2n×1 multiplexers and selects one cell from among read cells using an RFA generated by the RFA generator, and outputs it.

It is preferable that the cell count includes two subtracters, which compute the newly stored cells and the newly read cells at this cell time; and an adder-subtractor, which adds the cell count stored in shared FIFO buffering device up to before one cell time and the cell count stored newly at this cell time, and subtracts the cell count to be read newly, and finally computes the cell count stored in the shared FIFO buffering device at this cell time, and outputs to the adders of the RFA generator of the output device in order to compute the FIFO buffer address to be read from among the shared FIFO buffer at the next cell time.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
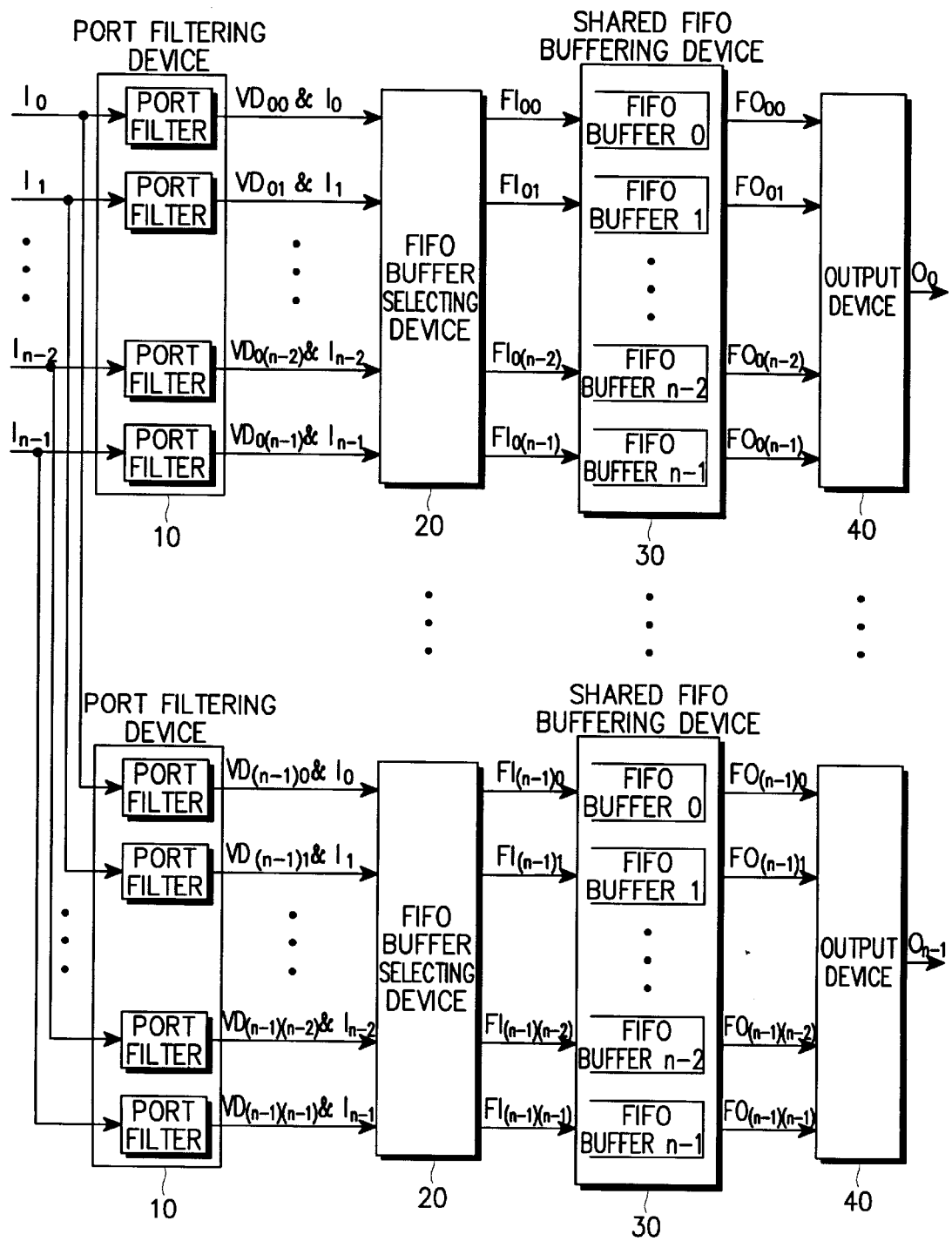
FIG. 1 is a block diagram of an earlier n×n switch.

FIG. 1 is a block diagram of the earlier n×n switch discussed in the Description of the Related Art above. A plurality of port filtering devices 10 feed a plurality of FIFO buffer selecting devices 20 which in turn feed a plurality of shared FIFO buffering devices 30 which in turn feed a plurality of output devices 40.

Figure 2:
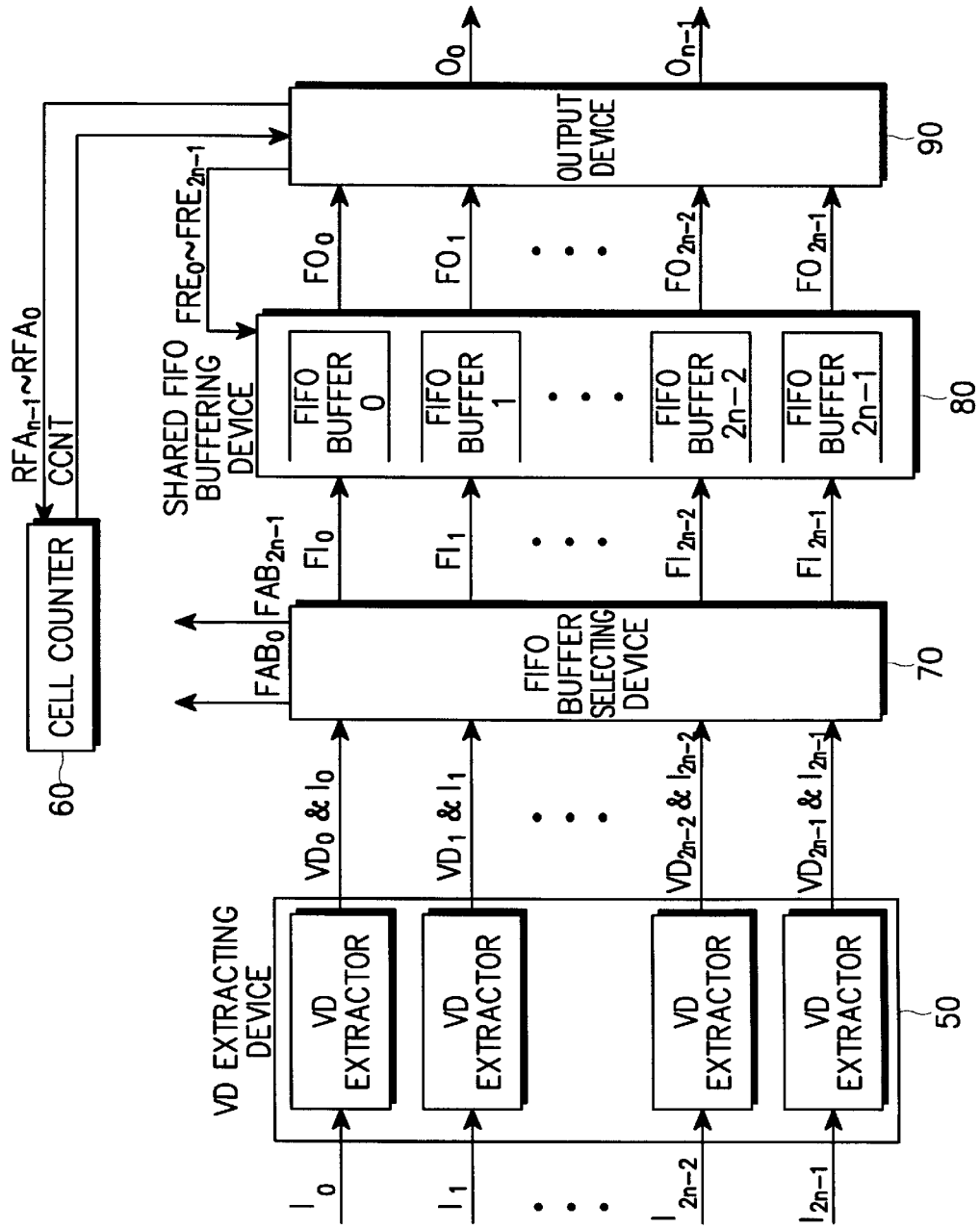
FIG. 2 is a block diagram of a 2n×n multiplexing switch constructed according to the principles of the present invention.

The present invention is explained in detail referring to FIG. 2 hereafter. FIG. 2 is a block diagram of a 2n×n multiplexing switch of the present invention. In the present invention, as the input of 2n×n multiplexing switch, 2n cells are inputted to a VD extracting device (50) including 2n VD extractors.

The cell transmitted to each input port has a cell form, wherein the cell is effective every cell time, or a dummy cell form. And in the 2n×n multiplexing switch, the cells are selectively chosen and stored in a FIFO buffer selecting device (70) according to a routing tag among the 2n cells ($I_o$~$I_{2n-1}$) being inputted every period and transmitted to an output device (90) through a shared FIFO buffering device (80). The output device (90) generates n cells ($O_0$~$O_{n-1}$) which are outputted through the output port every cell period.

The structure of the device (70) should be composed according to what the user wants, so there is no fixed structure.

The FIFO buffer selecting device (70) selects the FIFO buffer where each cell should be stored, referring to the cells ($I_o$~$I_{2n-1}$) that are transmitted through 2n VD extractors and referring to the VD bits ($VD_o$~$VD_{2n-1}$), and transmits the cell to the corresponding FIFO buffer. A cell counter (60) reads the address of each FIFO buffer in the shared FIFO buffering device (80), where the address is stored in the buffer by the FIFO buffer selecting device (70). Then the cell counter informs the output device (90) of the result of the cell count. The cell counter reads the FIFO address for reading from the output device (90).

Figure 3:
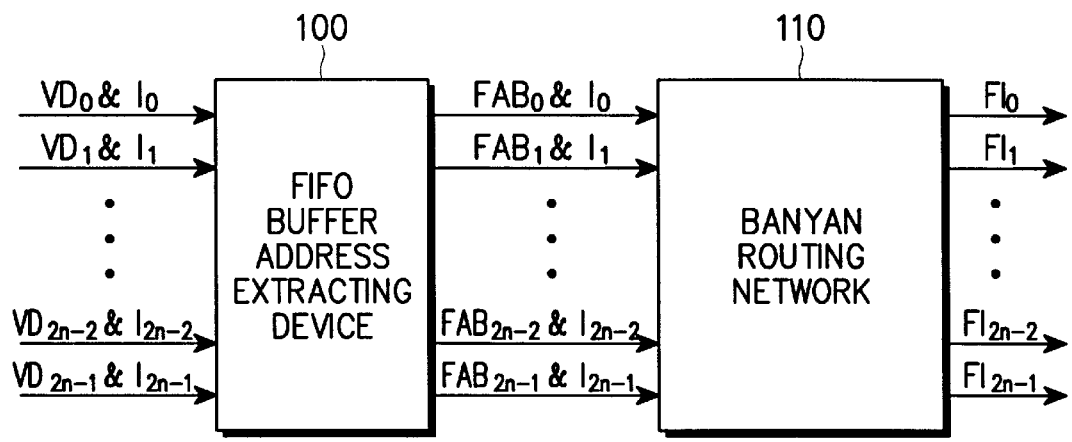
FIG. 3 is a detailed block diagram of the FIFO buffer selecting device of FIG. 2.

FIG. 3 is a detailed block diagram of the FIFO buffer selecting device (70). The FIFO buffer selecting device (70) comprises a FIFO buffer address extracting device (100) and a Banyan routing network (110), i.e., the data inputted from the VD extracting device (50) is stored in the shared FIFO buffering device (80) uniformly through the FIFO buffer address extracting device (100) and the Banyan routing network (110).

Figure 4:
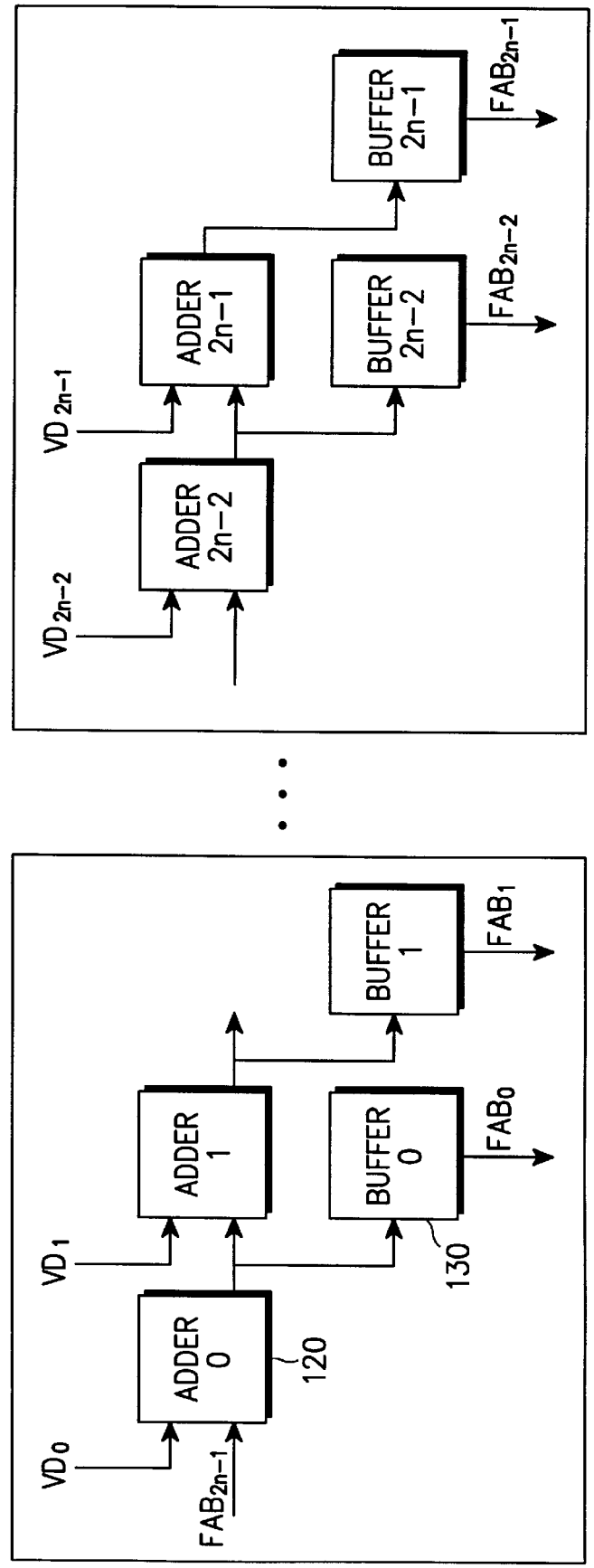
FIG. 4 is a detailed block diagram of the FIFO buffer address extracting device of FIG. 3.

FIG. 4 is a detailed block diagram of the FIFO buffer address extracting device (100) within the FIFO buffer selecting device (70); the FIFO buffer address extracting device (100) includes 2n adders and 2n buffers. The $ADDER_0$ adds 1, if the value of $VD_0$ in the FIFO address buffer $FAB_{2n-1}$ that is finally read at the previous cell time is 0, and adds 0 if the value is 1 so that it can be inputted to the next adder $VD_1$ and the result is stored in the $BUFFER_0$ at the same time.

The values ($FAB_0$~$FAB_{2n-1}$) that are stored in these buffers ($BUFFER_0$~$BUFFER_{2n-1}$) represent the addresses for each address of FIFO buffer in the shared FIFO buffering device (80) where each cell should be stored, and used as the routing tag representing the routing path that should be passed to the next phase of Banyan routing network (110).

The Banyan routing network(110) transmits the cell to the FIFO buffer in the shared FIFO buffering device (80) to which each cell is to be reached using the FAB.

Figure 5:
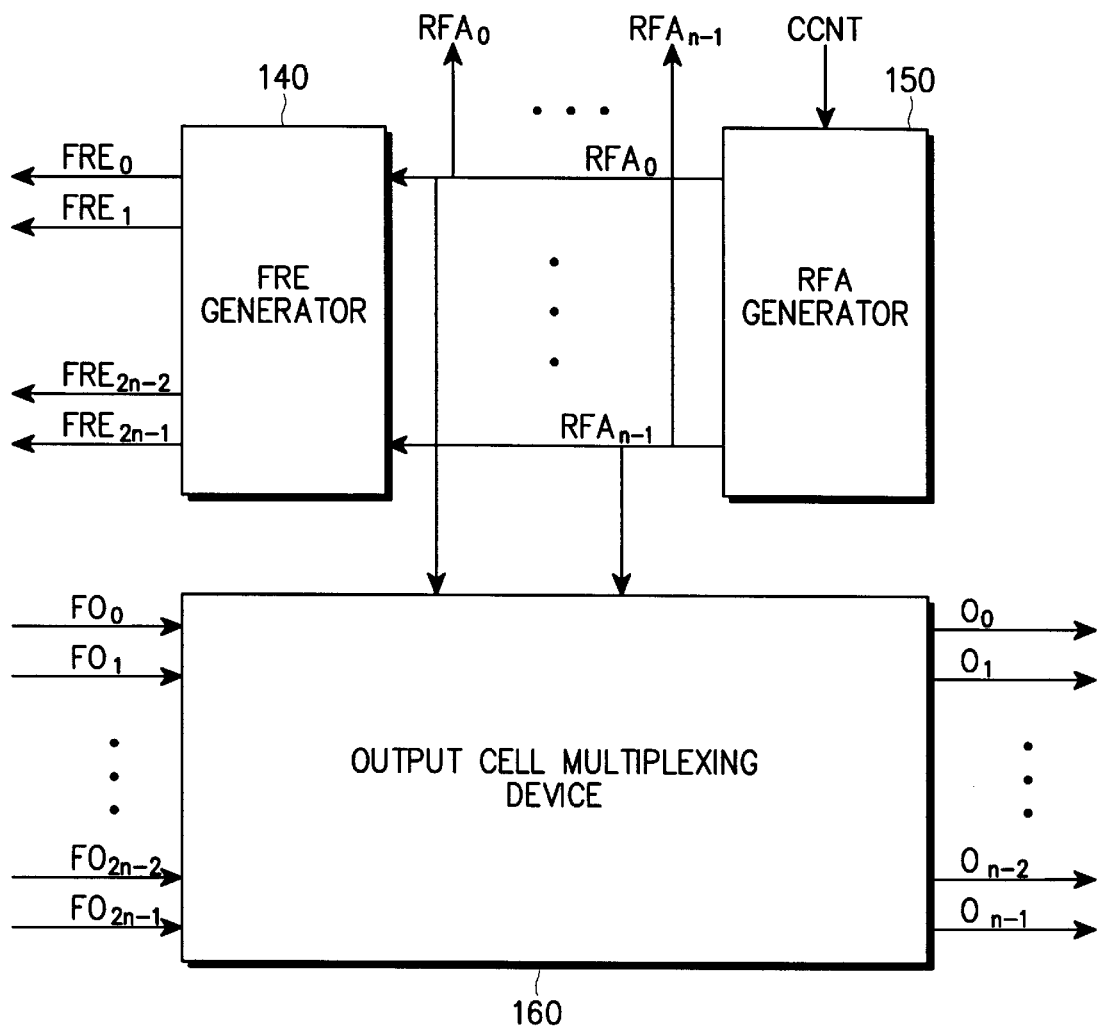
FIG. 5 is a detailed block diagram of the output device of FIG. 2.

FIG. 5 is a detailed block diagram of the output device (90) of the present invention. The output device (90) reads out the 2n cells that are stored in the shared FIFO buffers with Round-robin scheduling in the order that is stored, to the maximum n, and transmits the cell to the output port. If the number of cells that are in the shared FIFO buffer is less than n, as many cells as there exist are outputted along with dummy cells to the output ports.

The output device (90) includes, as illustrated in FIG. 5, a FIFO read enable generator (140), a read FIFO buffer address generator (150) and an output cell multiplexing device (160).

If the cell count (CCNT) of the FIFO buffer read finally before one cell time is larger than zero, $ADDER_0$ adds one, or else adds zero, and the result is inputted to the next adder and to the buffer $BUFFER_0$ at the same time. If the CCNT is larger than i, $ADDER_i$ adds one to the inputted value from former adder $ADDER_{i-1}$, or else adds zero, and then transfers the result to the next adder $ADDER_{i+1}$ and buffer $BUFFER_i$.

Figure 6:
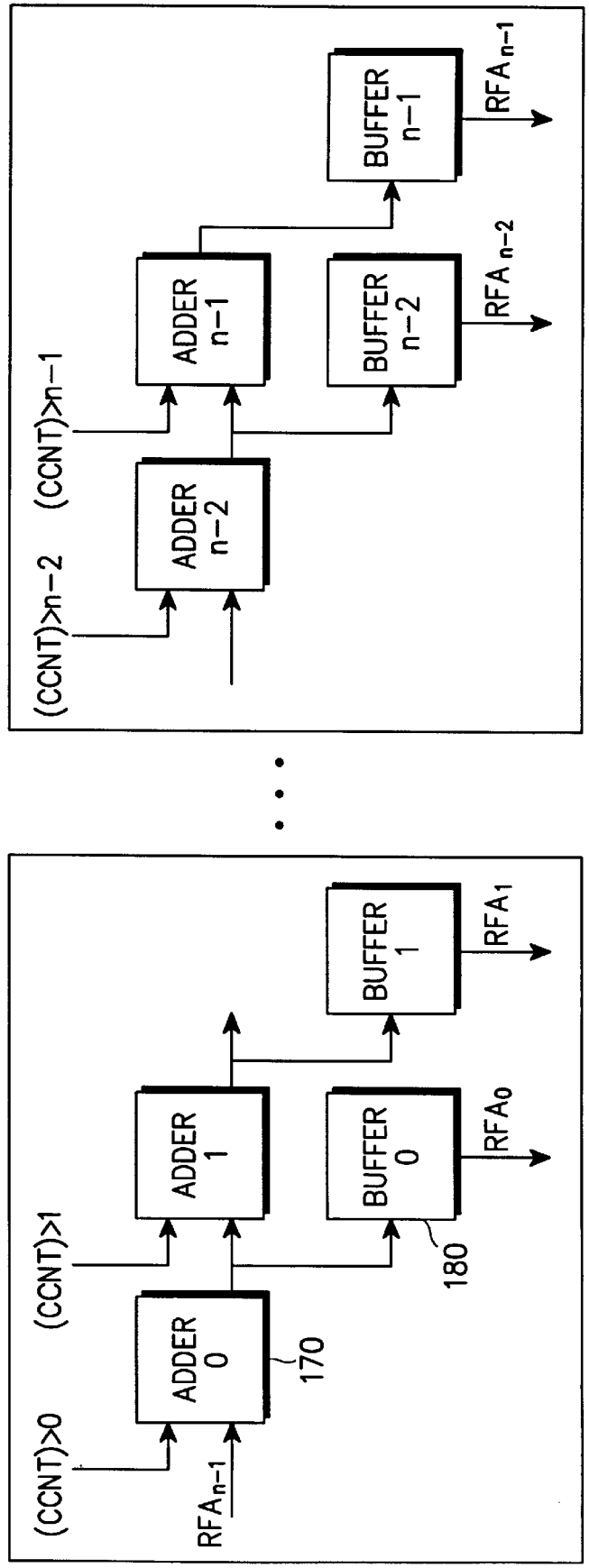
FIG. 6 is a detailed block diagram of the RFA generator of FIG. 5.

FIG. 6 is a detailed block diagram of the RFA generator (150) in the output device (90). The RFA generator includes n adders and n buffers. The FIFO address to be read is stored in the buffer.

Figure 7:
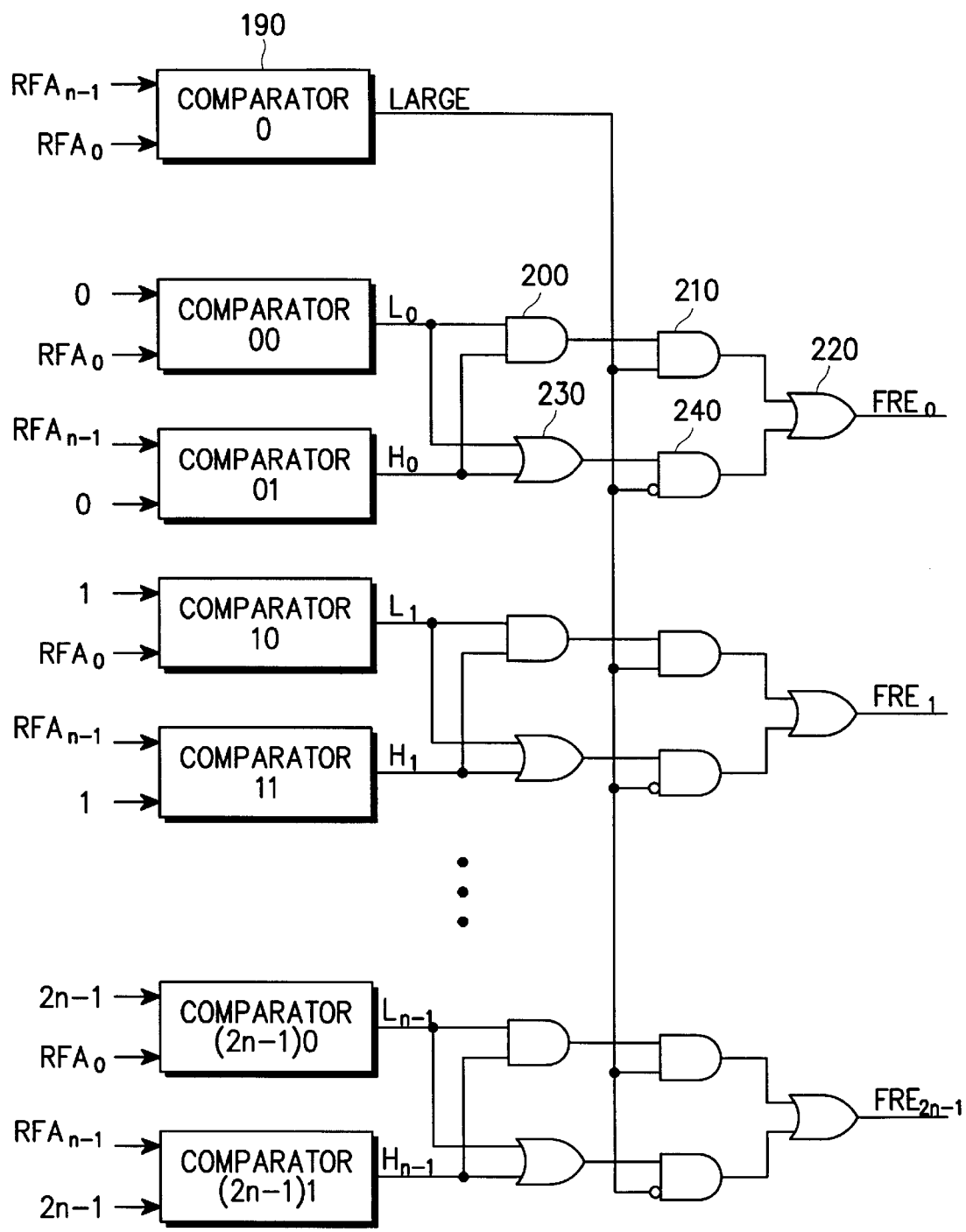
FIG. 7 is a detailed block diagram of the FRE generator of FIG. 5.

FIG. 7 is a detailed block diagram of the FRE generator (140) of FIG. 5. The FRE is generated using the RFA, which is generated by the RFA generator (150). As illustrated in FIG. 7, the FRE generator can be constructed using 4n+1 comparators (190), 4n OR gates (220)(230) and 6n AND gates (200), (210), (240).

$COMPARATOR_0$ (190) compares $RFA_0$ and $RFA_{n-1}$, and if $RFA_{n-1}$ is larger than $RFA_0$, it outputs one, or else zero. And if $COMPARATOR_0$'s (190) result is one, then $COMPARATOR_{k0}$'s result $L_k$ and $COMPARATOR_{k1}$'s result $H_k$ are multiplied logically by AND gates (200) and (210) it becomes the value of each $FRE_k$. If $COMPARATOR_0$'s (190) result is zero, then $COMPARATOR_{k0}$'s result $L_k$ and $COMPARATOR_{k1}$'s result $H_k$ are added logically by OR gate (230) and AND gate (240) and the result becomes the value of each $FRE_k$ (220).

If the $FRE_k$ is zero, then a cell from the kth FIFO buffer is read, or else if $FRE_k$ is one, then $F0_k$ is generated as a dummy cell. The cells ($F0_0$~$F0_{2n-1}$) which were read through such a method are transferred to the output cell multiplexing device (160).

Figure 8:
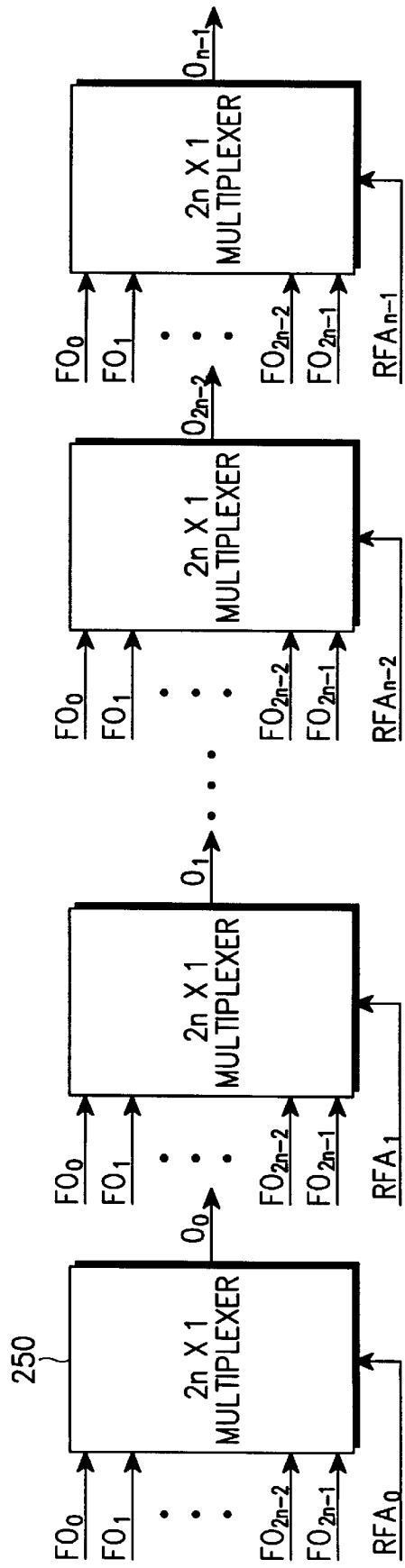
FIG. 8 is a detailed block diagram of the output cell multiplexing device of FIG. 5.
Figure 9:
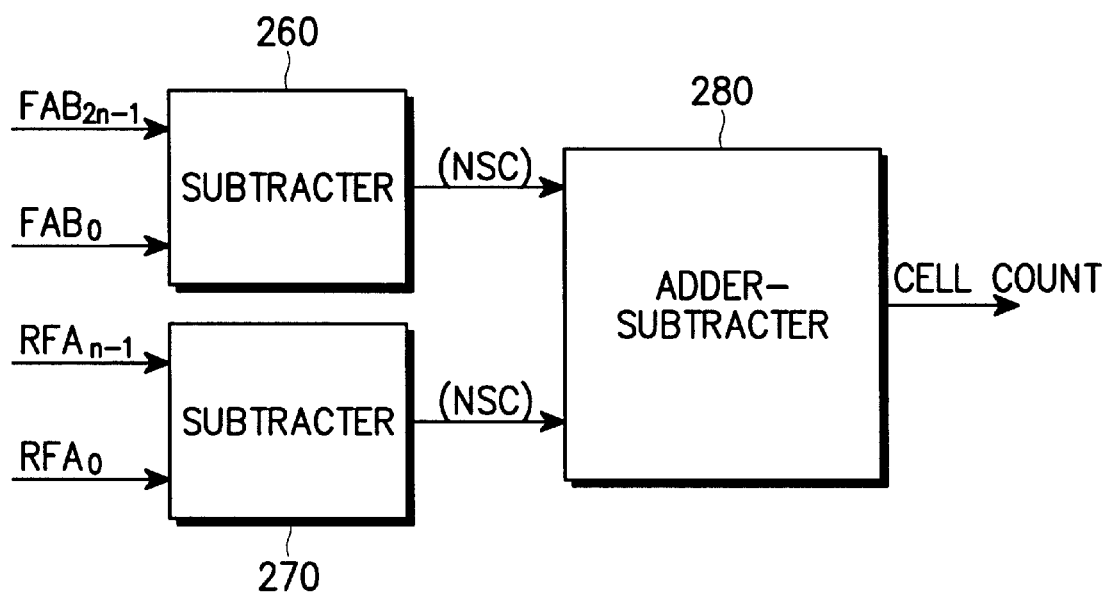
FIG. 9 is a detailed block diagram of the cell counter of FIG. 5.

The multiplexer (250) of FIG. 8 selects one cell from among the read cells ($F0_0$~$F0_{2n-1}$) by using the RFA generated by the RFA generator (150) and outputs it. That is, the $OUTPUT PORT_0$ selects the xth cell $FO_x$ according to the value x of $RFA_0$. The cell counter (60) records the number of cells currently being stored in the shared FIFO buffering device (80). The cell counter (60) is constructed of two subtracters (260),(270) and an adder- subtractor (280) as illustrated in FIG. 9.

The two subtracters (260),(270) compute the number of cells which have been newly stored at this cell time (t=1 for example) and the number of cells which have been newly read respectively, and the adder-subtractor (280) computes the number of cells which will be newly saved at this time (t=1 for example) and the number of cells which have been newly read respectively. The adder-subtractor(280) adds the CCNT (at t=0 for example) and the newly stored cell(NSC) and subtracts the newly read cell(NRC) and computes the number of cells which are stored in the shared FIFO buffering device (80) at this cell time (t=1 for example), and the result is transferred to the adder of the RFA generator for computing the address of the FIFO buffer to be read from the shared FIFO buffering device(80) at the next cell time, where the NSC is the number of the newly stored cell which has been stored at this cell time (t=1 for example) and the NRC is the number of the cells which have been stored at this cell time (t=1for example), and the CCNT has been stored in the shared FIFO buffering device(80) up to before one cell time (t=0 for example).

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A 2n×n multiplexing switch n being positive integer, the switch, comprising:
    a valid extracting device, comprising 2n valid extractors, for validating routing tags of inputted cells and for determining whether or not a cell is to be saved and generating valid signals;
    a first in first buffer selecting device for selecting a first in first out buffer to store each cell using said valid signals and for transferring a cell to said selected first in first out buffer;
    a shared first in first out buffering device, comprising 2n shared first in first out buffers and storing cells;
    an output device reading cells stored in said first in first out buffers and transferring n cells to output ports; and
    a cell counter counting cells being currently stored in said shared first in first out buffer device using data from said first in first out buffer selecting device and said output device.

2. A 2n×n multiplexing switch as set forth in claim 1, said first in first out buffer selecting device comprising a first in first out buffer address extracting device and a Banyan routing network.

3. A 2n×n multiplexing switch as set forth in claim 2, said first in first out buffer address extracting device generating a first in first out address buffer using 2n adders and 2n buffers.

4. A 2n×n multiplexing switch with n being a positive integer, the switch, comprising:
    a valid extracting device, comprising 2n valid extractors, validating routing tags of inputted cells and determining whether or not a cell is to be saved and generating valid signals;
    a first in first out buffer selecting device selecting a first in first out buffer to store each cell using said valid signals and transferring a cell to said selected first in first out buffer, said first in first out buffer selecting device comprising a first in first out buffer address extracting device and a Banyan routing network, said first in first out buffer address extracting device generating a first in first out address buffer using 2n adders and 2n buffers, said adders inputting a first in first out address buffer finally read at a previous cell time and valid signal, and when said valid signal is zero, then one is added, or else when said valid signal is one, then zero is added and the result becomes an input to a next adder and at the same time is stored in said buffer;
    a shared first in first out buffering device, comprising 2n shared first in first out buffers and storing cells;

an output device reading cells stored in said shared first in first out buffers and transferring n cells to output ports; and a cell counter counting cells being currently stored in said shared first in first out buffer device using data from said first in first out buffer selecting device and said output device.

5. A 2n×n multiplexing switch with n being a positive integer, the switch, comprising:

a valid extracting device, comprising 2n valid extractors, validating routing tags of inputted cells and determining whether or not a cell is to be saved and generating valid signals;

a first in first out buffer selecting device selecting a first in first out buffer to store each cell using said valid signals and transferring a cell to said selected first in first out buffer;

a shared first in first out buffering device, comprising 2n shared first in first out buffers and storing cells;

an output device reading cells stored in said shared first in first out buffers and transferring n cells to output ports, said output device comprising:

a read first in first out buffer address generator reading a cell count;

a first in first out buffer read enable generator inputting the read first in first out buffer address from said read first in first out buffer address generator; and an output cell multiplexing device inputting the read first in first out buffer address from said read first in first out buffer address generator and inputting cells from said shared first in first out buffering device; and a cell counter counting cells being currently stored in said shared first in first out buffer device using data from said first in first out buffer selecting device and said output device.

6. A 2n×n multiplexing switch as set forth in claim 5, said read first in first out buffer address generator comprising:

n adders, for adding one when the cell count finally read before one cell time is above zero, or else adding zero, and inputting a result to a next adder; and n buffers, at the same time inputting values inputted from said adder.

7. A 2n×n multiplexing switch as set forth in claim 6, an $i^{th}$ adder adding one, when the cell count inputted from a previous adder is above i, or else adding zero, and transferring a result to a next adder and to the buffer.

8. A 2n×n multiplexing switch as set forth in claim 5, said first in first out buffer read enable generator generating a first in first out buffer address enable signal using a read first in first out buffer address generated by said read first in first out buffer address generator; said first in first out buffer read enable generator comprising:

4n+1 comparators, 4n OR gates and 6n AND gates.

9. A 2n×n multiplexing switch as set forth in claim 5, said output cell multiplexing device comprising n 2n×1 multiplexers; said output cell multiplexing device selecting one cell from among read cells using a read first in first out buffer address generated by said read first in first out buffer address generator and outputting it.

10. A 2n×n multiplexing switch with n being a positive integer, the switch, comprising:

a valid extracting device, comprising 2n valid extractors, validating routing tags of inputted cells and determining whether or not a cell is to be saved and generating valid signals;

a first in first out buffer selecting device selecting a first in first out buffer to store each cell using said valid signals and transferring a cell to said selected first in first out buffer;

a shared first in first out buffering device, comprising 2n shared first in first out buffers and storing cells;

an output device reading cells stored in said shared first in first out buffers and transferring n cells to output ports; and a cell counter counting cells being currently stored in said shared first in first out buffer device using data from said first in first out buffer selecting device and said output device, said cell counter comprising:

two subtracters computing the newly stored cells and the newly read cells at this cell time; and an adder-subtractor for adding a cell count stored in said shared first in first out buffering device up to before one cell time and a cell count newly stored at this cell time, and for subtracting a cell count to be newly read, and finally computing a cell count stored in said shared first in first out buffering device at this cell time, and for outputting to the adders of said read first in first out buffer address generator of said output device in order to compute first in first out buffer address to be read from among said shared first in first out buffers at a next cell time.

11. An apparatus, comprising:

a valid extracting device validating routing tags of inputted cells and determining whether or not a cell is to be saved and generating valid signals;

a first in first out buffer selecting device selecting a first in first out buffer to store each cell using said valid signals and transferring a cell to said selected first in first out buffer;

a shared first in first out buffering device, comprising shared first in first out buffers and storing cells;

an output device reading cells stored in said shared first in first out buffers and transferring cells to output ports; and a cell counter counting cells being currently stored in said shared first in first out buffer device using data from said first in first out buffer selecting device and said output device.

12. The apparatus of claim 11, with said first in first out buffer selecting device comprising a first in first out buffer address extracting device and a Banyan routing network, said first in first out buffer address extracting device generating a first in first out address buffer using adders and buffers, said adders inputting a first in first out address buffer finally read at a previous cell time and valid signal, and when said valid signal is zero, then one is added, or else when said valid signal is one, then zero is added and the result becomes an input to a next adder and at the same time is stored in said buffer.

13. The apparatus of claim 11, with said output device comprising:

a read first in first out buffer address generator reading a cell count;

a first in first out buffer read enable generator inputting the read first in first out buffer address from said read first in first out buffer address generator; and an output cell multiplexing device inputting the read first in first out buffer address from said read first in first out buffer address generator and inputting cells from said shared first in first out buffering device.

14. The apparatus of claim 11, with said cell counter comprising:
   two subtracters computing the newly stored cells and the newly read cells at a current cell time; and
   an adder-subtractor for adding a cell count stored in said shared first in first out buffering device up to before the current cell time and a cell count newly stored at the current cell time, and for subtracting a cell count to be newly read, and finally computing a cell count stored in said shared first in first out buffering device at the current cell time, and for outputting to the adders of said read first in first out buffer address generator of said output device in order to compute first in first out buffer address to be read from among said shared first in first out buffers after the current cell time.

15. A method, comprising the steps of:
   validating routing tags of inputted cells;
   determining whether any one of said inputted cells is to be saved;
   generating valid signals;
   selecting shared first in first out buffers to store each one of said selected cells using said valid signals;
   transferring said selected cells to said selected shared first in first out buffers;
   storing said selected cells in said selected shared first in first out buffers;
   reading cells stored in shared first in first out buffers and transferring n cells to output ports, said shared first in first out buffering device comprising 2n shared first in first out buffers and storing cells; and
   counting the cells currently being stored in said shared first in first out buffers according to the newly stored cells in said shared first in first out buffers and the newly read cells.

16. The method of claim 15, with the cells being selectively chosen and stored according to said routing tag among the 2n cells.

17. The method of claim 15, with said step of counting the cells further comprising:
   determining the number of newly stored cells in said first in first out buffers at a certain cell time;
   determining the number of cells being newly read at the certain cell time; and
   determining the number of cells being saved in said first in first out buffers at the certain time according to the cells stored before the certain time, the number of newly stored cells, and the number of newly read cells.

18. The method of claim 15, with said step of selecting a first in first out buffer, further comprising the steps of:
   generating a first in first out buffer using 2n adders and 2n buffers; and
   inputting a first in first out address buffer read at a previous cell time and valid signal, and when said valid signal is zero, then one is added by using adders and buffers, said adders inputting a first in first out address buffer read at a previous cell time and valid signal, and when said valid signal is zero, then one is added, or else when said valid signal is one, then zero is added and the result becomes an input to a next adder and at the same time is stored in the buffer.

19. The apparatus of claim 15, with said step of counting the cells further comprising:
   computing by a pair of subtracters, the newly stored cells and the newly read cells at a certain cell time; and
   adding by a adder-subtractor a cell count stored in said shared first in first out buffers up to one cell time before the certain cell time and a cell count newly stored at the certain cell time, subtracting a cell count to be newly read, computing a cell count stored in said shared first in first out buffers at the certain cell time, and outputting to the adders of a read first in first out buffer address generator of an output device outputting to the output ports in order to compute first in first out buffer address to be read from among said shared first in first out buffers at a next cell time.

20. The method of claim 15, with said step of reading cells stored, further comprising:
   storing a first in first out address of one of the inputted cells to be read in a buffer;
   adding one when the cell count of the first in first out buffer read is larger than zero and outputting a first result;
   adding the first result with one when the cell count is larger than one and outputting a second result; and
   selecting a cell from among the read cells according to the first and second result for outputting to one of said output ports.

* * * * *